United States Patent
Fritsch

(10) Patent No.: US 9,829,342 B2
(45) Date of Patent: Nov. 28, 2017

(54) SENSOR SYNCHRONIZATION METHOD AND SENSOR MEASURING SYSTEM APPERTAINING THERETO

(71) Applicant: Hexagon Technology Center GmbH, Heerbrugg (CH)

(72) Inventor: Robert Fritsch, Balgach (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 800 days.

(21) Appl. No.: 14/189,776

(22) Filed: Feb. 25, 2014

(65) Prior Publication Data
US 2014/0240688 A1    Aug. 28, 2014

(30) Foreign Application Priority Data
Feb. 26, 2013 (EP) .................................... 13156711

(51) Int. Cl.
*G01C 3/08* (2006.01)
*G01C 25/00* (2006.01)
(Continued)

(52) U.S. Cl.
CPC ............ *G01C 25/005* (2013.01); *G01B 11/02* (2013.01); *G01D 5/24495* (2013.01);
(Continued)

(58) Field of Classification Search
CPC .. G01C 25/005; G01B 11/02; G01D 5/24495; G01D 18/00; G01S 7/003; G01S 7/497;
(Continued)

(56) References Cited

U.S. PATENT DOCUMENTS 7,752,483 B1 * 7/2010 Muresan ............ G01S 17/023
386/207

2006/0066836 A1  3/2006 Bridges et al.
2007/0088775 A1  4/2007 Asplund et al.
2009/0268021 A1  10/2009 Kawaragi

FOREIGN PATENT DOCUMENTS

DE   10 2010 039947 A1   3/2012
EP       2 533 022 A1   12/2012
(Continued)

OTHER PUBLICATIONS

Huq, Mohammad Rezwanul; Andreas Wombacher, Peter M. G. Apers. "Inferring Fine-Grained Data Provenance in Stream Data Processing: Reduced Storage Cost, High Accuracy". Conference Paper, Aug. 2011. file:///C:/Users/sabraham/Downloads/Inferring_Fine-Grained_Data_Provenance_in_Stream_D.pdf.*

(Continued)

*Primary Examiner* — Samantha K Abraham
(74) *Attorney, Agent, or Firm* — Maschoff Brennan

(57) ABSTRACT

A synchronization method for at least two sensors, which enables synchronized collection of a sensor value of a slave sensor in relation to a predetermined intended value of a master sensor. Time-dependent measured values of the master sensor are used to determine open parameters of a prediction model, on the basis of which a time associated with a master sensor intended value to be predetermined is extrapolated. When this time is reached, a synchronization signal triggering the recording of a slave sensor value, in particular the recording of a measured value, is transmitted to the at least one slave sensor. Master sensor intended value and slave sensor value are provided as connected value tuple. As a result of continuous collection of measured values by the master sensor, it is possible to form updated extrapolation rules continuously. Predetermined intended values of the master sensor can have, in particular, an equidistant spacing.

20 Claims, 9 Drawing Sheets

(51) Int. Cl.
  *G01D 18/00* (2006.01)
  *G01D 5/244* (2006.01)
  *G01S 17/42* (2006.01)
  *G01B 11/02* (2006.01)
  *H04W 56/00* (2009.01)
  *H04Q 9/04* (2006.01)
  *G01S 17/87* (2006.01)
  *G01S 17/89* (2006.01)
  *G01S 7/00* (2006.01)
  *G01S 7/497* (2006.01)

(52) U.S. Cl.
  CPC .............. *G01D 18/00* (2013.01); *G01S 7/003* (2013.01); *G01S 7/497* (2013.01); *G01S 17/42* (2013.01); *G01S 17/87* (2013.01); *G01S 17/89* (2013.01); *H04Q 9/04* (2013.01); *H04W 56/00* (2013.01)

(58) Field of Classification Search
  CPC .......... G01S 17/42; G01S 17/87; G01S 17/89; H04Q 9/04; H04W 56/00
  See application file for complete search history.

(56) References Cited

FOREIGN PATENT DOCUMENTS

| | | |
|---|---|---|
| JP | 02 176452 A | 7/1990 |
| WO | 2010/139964 A2 | 12/2010 |

OTHER PUBLICATIONS

European Search Report dated Jul. 30, 2013 as received in Application No. 13 15 6711.

* cited by examiner

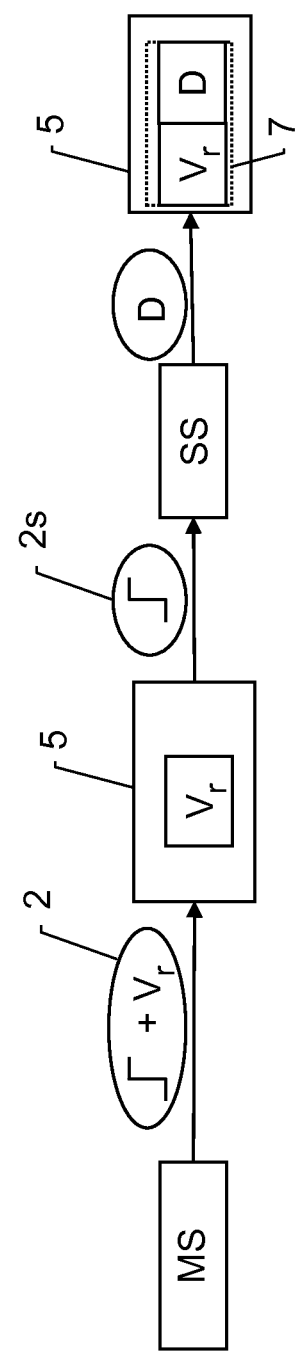

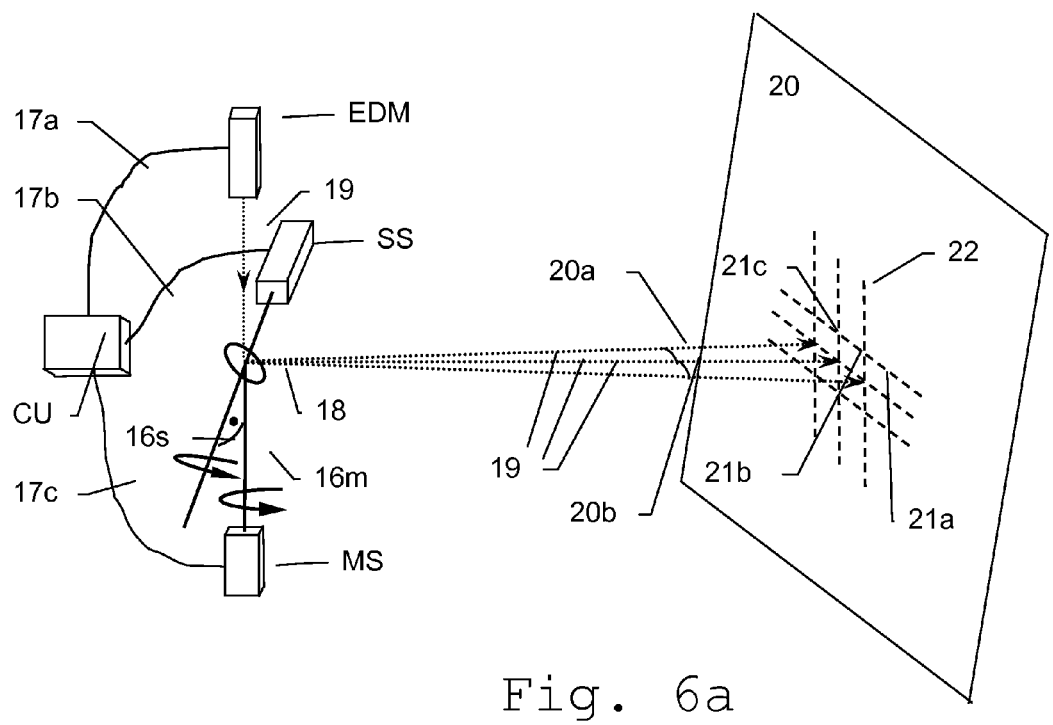
Fig. 6a
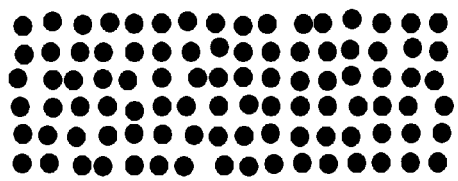 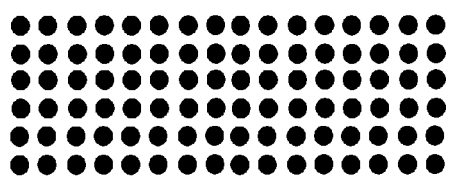
Fig. 6b          Fig. 6c

SENSOR SYNCHRONIZATION METHOD AND SENSOR MEASURING SYSTEM APPERTAINING THERETO

FIELD OF THE INVENTION

The invention relates to a sensor synchronization method and to a sensor measuring system.

BACKGROUND

In a measuring system comprising a plurality of sensors, it is often desirable to collect sensor values from all sensors at the same time in order to produce a connected data record. By way of example, if the position of a point object is to be determined completely at a specific time, the three corresponding coordinates have to be collected at the same time.

One option to this end is to emit a trigger signal simultaneously to all sensors involved, which trigger signal triggers measured value collection by the individual sensors. A problem herein is that, in general, it is nevertheless not the case that all measured values are collected at a single time due to time delays of different types. By way of example, delays emerge due to different signal run-times of trigger signal and measurement signals or due to varying sensor startup times and sensor latency times, the duration of which moreover may vary depending on process or surroundings. According to the prior art, the problem can be solved in some cases by virtue of emitting such a synchronization signal not simultaneously to all sensors, but with a time offset, adapted to the respective delay times. However, this means additional outlay and presumes knowledge of the delay times, which may not be able to be established in all cases.

There are further problems in the case of continuous measurements, i.e. during continuous production of value tuples respectively having one value from various sensors. The individual sensors are usually clocked differently, due to, inter alia, different sensor dead times, so that even if first measurements are triggered simultaneously, the following measurements will no longer be simultaneous, or it is necessary to wait until the individual clocks once again enable a common measurement time, leading to idle times of individual sensors. An approximate solution consists of making do with only approximate synchronicity of the individual sensor values and considering those sensor values whose time interval is lowest or which do not exceed a temporal maximum interval as being a connected data record.

Another approximate solution emerges by virtue of extrapolating or interpolating approximate sensor values, from collected sensor measured values, in respect of a desired common time.

Here, the term "sensor measured value" or "measured value" is understood to mean a collected sensor value, i.e. a value which is directly available by a measurement of the sensor. The collection time of a measured value is the time at which the measured value was actually measured. The latency time is that time interval passing from this time until the time at which this measured value is available.

An extrapolated or interpolated sensor value is in contrast to a measured value. This refers to a value calculated from measured values. The calculation is brought about on the basis of an extrapolation rule for a value of the time variables to be predetermined. The term "extrapolation time" means such a predetermined time value.

The term "sensor value" is understood to mean an overarching term, which is used if there is no need for a restriction to one of the two options. Accordingly, the term "recording time" comprises both a collection time and an extrapolation time.

Using extrapolation or interpolation for predetermined time values, it is possible to provide sensor values with constant time intervals by appropriate clocks, but not sensor values with equidistant spacing.

By way of example, such equidistant sensor values are desired when detecting surfaces. To this end, use is often made of methods which scan the topography of a structure, such as e.g. a building, in sequence and make recordings in the process, as a result of which a 3D point cloud is produced. A conventional approach lies in scanning by means of a laser scanner. The latter consists of a laser rangefinder and a device, usually developed as two angle sensors, for continuously aligning the laser rangefinder or the laser beam, brought about by rotation about two axes, and detecting the two direction angles. Accordingly, the position of a surface point is generally determined in spherical coordinate form by virtue of, firstly, the two alignment angles being measured relative to the two rotational axes and, secondly, the distance to the sighted surface point being measured by means of the laser beam.

Here, the time delays already mentioned above cause difficulties, in particular those caused by the latency time of the angle sensor which, in the case of an angle sensor in the prior art, may be e.g. 600 ns. A distance measurement at a specific angle can only be triggered at a time offset by at least this time interval; however, by then, the alignment has already changed, i.e. no longer corresponds to the determined angle. As a result of this, distance and angle do not relate to precisely the same surface point. A possible downstream interpolation of a distance value to the matching alignment time is connected with disadvantages since there may be discontinuities which cannot be estimated between two distance values, caused by irregular surface profiles.

In order to produce a regular point scanning pattern, it is accordingly important in scanners of the prior art for the distances already to be registered during the recording at equidistant angle intervals for both direction angles. Generally, the rotational speeds about the two rotational axes are not the same, but the angular velocity in one direction is significantly greater than in the other one such that line-by-line scanning is possible.

Since, according to the prior art, equidistant measuring of the angle sensor values is attempted to be achieved via a constant measuring frequency in the case of an unchanging angular velocity, the challenges for the uniformity of the rotation about the fast rotational axis are correspondingly great. Ensuring such precise clocking places high demands on the systematic accuracy of the corresponding angle sensor.

One option for solving problems in relation to the accuracy of measurements lies in extrapolation. WO 2010/139964 A2 discloses a method for operating a position encoder, by means of which random inaccuracies in an individual measurement can be identified. A position value is extrapolated from at least one position measured value in such a way that it is associated with the same time as a currently measured position value. A random error in the current measurement, for example an incorrectly read-out position code, causes a conspicuously large discrepancy between the two, as a result of which the measurement inaccuracy can be identified. The position measured value can then be replaced by the corresponding calculated value thereof, as a result of which the reliability of individual position values is increased.

A disadvantage of the method described in WO 2010/139964 A2 lies in the fact that an extrapolated position value is related directly to one measured value. This does not reduce the requirements on the systematic accuracy of the position sensor in respect of the provision of sensor values with equidistance from one another. An irregularity in this respect in the collected measured values will be transferred to the calculated values. Moreover, a disadvantage is that, as a result of this direct reference, the provision of sensor values is not decoupled from the sensor dead time and accordingly there is no provision of additional position values.

SUMMARY

The object of the present invention therefore consists in the provision of an improved sensor synchronization method and an improved sensor measuring system.

A further object of the present invention lies in the provision of an improved sensor synchronization method, which enables the provision of synchronized sensor values in a measuring system of at least two sensors.

A further object of the present invention lies in the provision of an improved sensor synchronization method, in such a way that, synchronized with a sensor value of a first sensor, in particular a sensor intended value, at least one sensor value, in particular a sensor measured value, from at least one further sensor is recorded.

A further object of the present invention lies in the provision of an improved sensor synchronization method, which decouples a synchronized recording of sensor values of at least two sensors from the latency time of the first sensor.

A further object of the present invention lies in the provision of an improved sensor synchronization method, which decouples the maximum possible number of sensor values of a first sensor, provided within a specific period of time, from the dead time of the first sensor.

A further object of the present invention lies in the provision of an improved sensor synchronization method, which enables synchronized collection of sensor measured values in respect of equidistant sensor values of a first sensor.

A further object of the present invention lies in the provision of an improved sensor synchronization method, which enables the provision of precise sensor values of a first sensor, in particular equidistant sensor values, and precise times derived therefrom in the case of lower requirements on the sensor accuracy and the duration of sensor dead time and sensor latency time than in the case of methods according to the prior art, or which enables greater measurement power than in methods according to the prior art in the case of the same requirements on the sensor technology.

A further object of the present invention lies in the provision of an improved measuring system, consisting of at least two sensors, which, synchronized with intended values, in particular equidistant intended values, of the first sensor, collects sensor values of at least the second sensor.

A special object of the present invention lies in the provision of an improved laser scanner, which enables the production of a regular 3D point cloud while placing lower requirements on the sensor technology than in the prior art, or which enables greater measurement power in the case of the same requirements on the sensor technology according to the prior art.

The invention relates to a synchronization method for at least two sensors. Here, according to the invention, the first sensor acts as master sensor, the measured value recording of which proceeds independently of the other sensors. The second sensor and optional further sensors act as slave sensors, which, in relation to master sensor values, record their own sensor values in a synchronized manner. To this end, a synchronization signal is in each case transmitted to such a dependent sensor at a synchronization time derived from a master sensor value.

The sensor values are preferably measured values collected in a synchronized manner in at least one slave sensor; this assumption is made in the following. Equally, according to the invention, the recorded slave sensor values can also be data derived from measured values, e.g. by extrapolation, if the measurement situation permits this.

According to the invention, a synchronization time is derived by extrapolation from a first time/measured value pair and at least one second time/measured value pair from the master sensor. To this end, these measurement data are used to specify a stored extrapolation rule, i.e. to calculate parameter values, e.g. the two parameter values in the case of linear extrapolation or a plurality of parameter values for extrapolation with linear curve fitting or for quadratic or other nonlinear extrapolation. Subsequently, a master sensor intended value is predetermined, for which recording of slave sensor values is to occur in a synchronized manner, and the time associated with this intended value is to be extrapolated on the basis of the specific extrapolation rule.

Master sensor values, for which there should be synchronized recording, can be predetermined as desired. In particular, intended values can be selected in such a way that, amongst themselves, they have an exactly equidistant spacing. Since this is, in particular, a predictive synchronization method, which does not synchronize already available sensor values by post-processing but enables future synchronized collection of sensor values, an intended value is preferably selected in such a way that the associated time lies in the future.

When this synchronization time is reached, a synchronization signal is thereupon transmitted to the slave sensor. Registration of the synchronization signal by such a sensor, which records in a dependent manner, triggers collection of a slave sensor measured value. This slave sensor measured value is now provided with the associated master sensor intended value as connected value tuple. According to the invention, there is no need to provide time data, be they recording times or extrapolated times, although these are preferably added to the data record.

According to the invention, the readout of a machine-readable code can underlie the collection of a master sensor measured value. In particular, these are understood to mean incremental or absolute position codes of a position sensor.

One or more algorithms can be stored as extrapolation rule, which algorithms render it possible to estimate the time profile of the measured values of the master sensor. By way of example, if the assumption can be made that, during a measuring procedure, the measured values change with substantially unchanging speed over time, a linear extrapolation rule can underlie this. It is also possible to use state estimators such as e.g. a Kalman filter. Accordingly, in addition to the collected time/measured value pairs, the value of at least one further measured variable or control variable describing the state of the master sensor can be included in the calculation of open parameter values, for example the value of an actuation signal of a master sensor drive. Moreover, different algorithms can be applied to different measurement phases. By way of example, quadratic extrapolation can be used for an acceleration phase and linear extrapolation or corresponding models for a Kalman filter can be used for a phase of uniform change. Also, by means of appropriate modeling, it is possible, for example, to form in advance a known discontinuous changing behavior of sensor values.

In the case of several stored algorithms, there can moreover be automatic switching between these, triggered by an error search. To this end, an extrapolated sensor value is compared to a measured value associated with the same time or at least approximately the same time, as soon as the latter is available after expiry of the latency time, during the running measurement. An error routine can then initiate the use of a more adequate algorithm in the case of deviations, whose number and/or magnitude exceed a specific measure.

An advantage of the method according to the invention lies in the fact that the provision of master sensor values and hence the synchronized measured value collection are decoupled from the latency time of the master sensor.

Due to the extrapolation, the synchronization signal associated with a master sensor value is provided at the time at which the master sensor has said value according to the above-described estimate, and not only at a time due to the latency time at which the master sensor already has a different value due to the continuous measuring. In the case of a direct dependence on a sensor measured value, a synchronization signal can always only be transmitted delayed by the latency time, i.e. only when the measured value is available and not already at the time that it is collected.

The duration of the latency time and also the regularity thereof are no longer decisive for the method according to the invention. The latency time merely has an effect in that the specific extrapolation rule can only be formed after the second or last time/value pair required for forming the rule was collected. Thus, there can merely be a time interval at the beginning of the measurement according to the method according to the invention, during which no intended value times can be provided.

A further, similar advantage of the method according to the invention lies in the fact that, as a result of the reference to an extrapolation rule, the dead time of the master sensor no longer constitutes a restricting factor for the maximum possible number of provided master sensor values per unit time and therefore for the maximum possible number of synchronization times per unit time.

It follows that, compared to the prior art, longer latency and dead times can be accepted or unchanged latency and dead times can be utilized for higher measuring rates of the measuring system.

The synchronization method according to the invention moreover provides the advantage that, as a result of using extrapolation, master sensor intended values and synchronization times can be provided in a precise manner without needing to place comparatively high demands on the startup and measurement accuracy of the master sensor.

According to the invention, the utilized extrapolation rule is preferably specified anew while the measurement is carried out by each newly measured time/measured value pair of the master sensor, i.e. the parameter values are recalculated, independently of whether or not this is a recursive filter. Such updating ensures that there is no drift between estimated and actual profile of the sensor values in the course of time, even if the time measured value profile only has a poorly expressed regularity.

The requirements on the uniformity of the measured value recording of the master sensor can be kept comparatively low by the method according to the invention, even if a measured value recording by a slave sensor is intended at equidistant intended values. As a result of the method according to the invention, synchronization times associated with precisely equidistant sensor values also emerge from master sensor measured values with irregular spacing. The requirements on the uniformity of the clocking sensor can therefore be kept comparatively low.

Moreover, as a result of this type of averaging, individual random incorrect measured values of the master sensor do not have such a strong effect as in the case of the direct use of measured value times as synchronization times.

According to the invention, the additional advantage is provided that even a temporary interruption of the measured value provision of the independent sensor does not force a termination of the method. By way of example, an interruption can be due to dropouts during the measured value collection or during the transmission of collected measured values; moreover, some position sensors according to the prior art for example provide no measured values if there is no change in position.

If the assumption can be made during a measurement that, at least at the beginning, the profile of the sensor values of the master sensor is equal or at least similar to the profile in a preceding measurement, the synchronization method according to the invention enables synchronized recording of slave sensor values even before the availability of a newly recorded time/measured value pair by virtue of the specific extrapolation rule of the preceding measurement being used until a new calculation of parameter values is possible. Possible deviations can be corrected subsequently on the basis of the then-available measured values. Hence, even the beginning of a measurement can be decoupled from the sensor latency time.

However, in the method according to the invention, it may be the case that, in individual cases, equidistant spacing cannot be maintained between the master sensor intended values. As a result of extrapolation on the basis of an updated rule, the parameter values of which differ significantly from those of the preceding rule due to a comparatively large irregularity of the underlying measurement, the time associated with the next equidistant intended value may have already passed. Naturally, it is no longer possible to emit a synchronization signal at this time.

In view of such a situation, it is optionally possible, according to the invention, to:

1. skip this intended value and use the intended value with twice the spacing as next intended value,
2. consider the intended value associated with the next possible synchronization signal transmission time as next intended value, or
3. determine the deviation of updated parameters from the preceding ones even before said updated parameters are applied and, if a fixed threshold is exceeded, block the use of the newly calculated parameters and instead continue the extrapolation on the basis of the already available parameters. Using this, it is possible to suppress the influence of individual measurement outliers. Additionally, if the threshold is exceeded a number of times in succession, provision can be made either for blocking no longer to occur since repeated large deviations indicate a new degree of measured-value change or, on the contrary, for a termination of the synchronization method to be initiated because it is assumed that there is a consistent error in the measured value collection.

According to the invention, the method in this case ensures that a minimum time interval is maintained between the individual extrapolated times and, hence, the individual synchronization signal transmission times in order to keep the individual data records safely distinguishable from one another.

Instead of being transmitted at an extrapolated time associated with a master sensor intended value, the synchronization signal can, according to the invention, also be transmitted at a time which differs from said extrapolated time in a defined manner and preferably lies before it. Such a delay time can, in particular, serve for taking into account delays as a result of signal run-times. This is because the slave sensor can naturally not collect a measured value precisely at the intended value time, at least because of the run-time of the synchronization signal. If the time duration that will pass between the transmission of the synchronization signal and the collection of a slave sensor measured value is known, the time for transmitting the synchronization signal can be selected to be that time which differs from the extrapolated intended value time by precisely this time duration. A precondition is that this time has not already passed when the intended value time is provided.

In addition to the previously described synchronization signal, referred to in the following text as first synchronization signal, it is possible according to the invention to transmit at least one further synchronization signal, in particular a second synchronization signal, in the case of a defined number of first synchronization signals. The number can be defined differently for each signal. Such a second synchronization signal enables a unique assignment of each first synchronization signal and the underlying master sensor measured value, as a result of which the reliability of the measuring system is increased. Moreover, if there is more than one dependent sensor, using synchronization signals with different clocks allows said sensors to be triggered differently. This may be expedient if newly recorded sensor values are not required from all slave sensors for each master sensor value, for example because these do not or hardly change within the clock time of the first synchronization signal. This can also be expedient for a measuring system with sensors with very different clock frequencies.

According to the invention, it is also possible to correct connected data records during post-processing in order to obtain improved synchronicity. The values provided as connected tuple have not been recorded at precisely the same times due to the delay times, e.g. run-times of the trigger signal, as already mentioned above. Therefore, all values within a tuple can be interpolated to one time. In principle, the recording time of any involved sensor can serve as common time. According to the invention, preferably that sensor is selected, in which an interpolation is inexpedient or afflicted by the greatest uncertainty due to value profiles that cannot be estimated; by way of example, in the case of a laser scanner, this is the laser rangefinder. The values of the other sensors in a tuple are then replaced by the interpolated equivalent thereof.

In relation to the master sensor, the calculation is brought about on the basis of the extrapolation rule applying during the measuring procedure for this time. Since all master sensor measured values are of course available in collected form after the completion of the measuring procedure and the latency time no longer limits knowledge at all, the calculation can alternatively be undertaken on the basis of the extrapolation rule actually corresponding to this time, i.e. which emerges from the measured values which, in terms of time, lie before and after the slave sensor recording time. Within this meaning, the term "interpolation rule" is more appropriate.

As a result of the presence of all master sensor measured values after the end of the measuring procedure, it is also possible to replace at least individual master sensor intended values by a master sensor measured value if the respective associated times are equal or the time difference is within defined boundaries.

However, it should be noted that a correction of master sensor values on the basis of different extrapolation or interpolation rules largely destroys a possibly present equidistance since the same time differences depending on extrapolation rule or interpolation rule result in different value differences. Equidistance can be obtained, although possibly to the detriment of the interpolation accuracy, by virtue of carrying out an interpolation not only over two time/value pairs but by virtue of a single interpolation rule being formed on the basis of all sensor measured values.

The method according to the invention can be realized by a sensor measuring system according to the invention, consisting of a master sensor with a clock, for example an internal clock, and at least one slave sensor, wherein a communication connection exists between master sensor and slave sensor, by means of which communication connection the master sensor can transmit the at least one synchronization signal to the slave sensor. The measuring system furthermore has a storage unit for providing the connected data records.

According to the invention, the sensor measuring system in particular has a control and evaluation unit which is suitable for receiving, providing, transmitting and evaluating synchronization signals, sensor values and data from times. In particular, this should also be understood to mean the recording times associated with sensor values such that the control and evaluation unit can establish and provide delay times between connected sensor values of the individual sensors, in particular in view of post-processing. To this end, the individual system components can be provided with synchronized clocks such that the sensors transmit the values thereof, provided with a timestamp, to the control and evaluation unit. Alternatively, it is also possible to provide sensor values with an internal timestamp when collected by the control and evaluation unit.

If such a control and evaluation unit is present, the communication between master sensor and slave sensor can run therethrough, i.e. it is possible to dispense with a direct data connection between master sensor and slave sensor.

BRIEF DESCRIPTION OF THE DRAWINGS

The synchronization method according to the invention and the sensor measuring system according to the invention are described in more detail and in a purely exemplary manner in the following text on the basis of exemplary embodiments schematically depicted in the drawing.

In detail:

FIG. 2 shows the schematic diagram of the synchronized measured value collection and provision according to the invention, FIG. 6a-c show a drawing of a sensor measuring system according to the invention, developed as laser scanner, and, in a graph, the depiction of the measuring result.

DETAILED DESCRIPTION

Figure 1A:
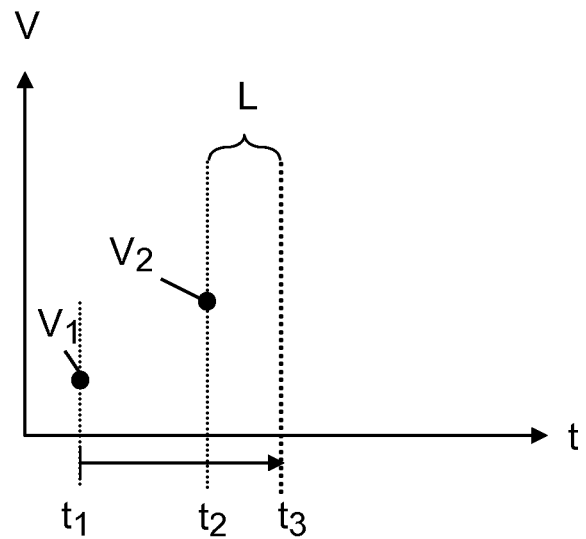
FIG. 1a-d show schematic diagrams of producing synchronization signals according to the synchronization method according to the invention.

FIGS. 1a-d show the basic course of the production of synchronization signals according to the synchronization method according to the invention, starting in FIG. 1a. The master sensor measures sensor values V from a start time onwards; at a time $V_1$ and at a later time $V_2$. Measured value $V_1$ is available up to the observed time $t_3$ and measured value $V_2$ becomes available at the time $t_3$. The time that passes from the collection of $V_2$ until it is available corresponds to the latency time L of the master sensor.

Figure 1B:
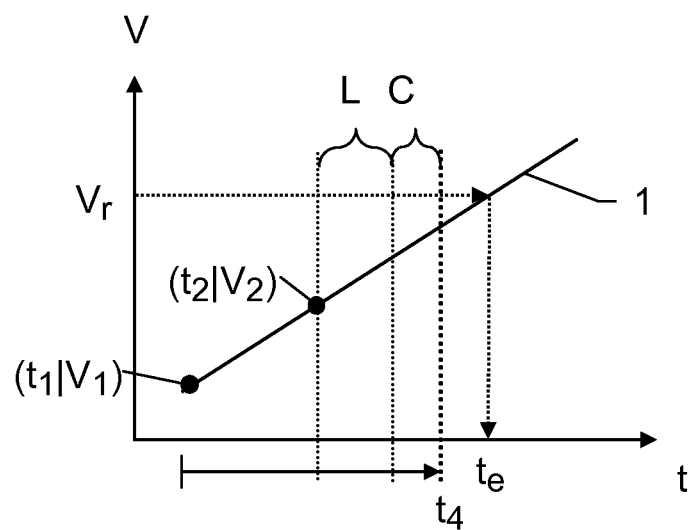

As depicted in FIG. 1b, the parameter values of the stored extrapolation rule are now calculated and provided from the two available time/measured value pairs $(t_1|V_1)$ and $(t_2|V_2)$. In the example, use is made of a linear algorithm. If another algorithm is more expedient, which e.g. is based upon a higher order polynomial, even more time/measured value pairs are collected and used for a parameter value calculation. According to the invention, the value of at least one further state signal of the master sensor, e.g. the value of an actuation signal of a sensor drive, can also additionally be used for specifying an appropriate extrapolation rule, e.g. an estimator. On the basis of the then available specific extrapolation rule 1, a time $t_e$ is extrapolated, at which the master sensor will or would measure a predetermined master sensor intended value $V_r$ according to this estimate. The time duration C, which passes between the collection of $V_2$ and the provision of $t_e$, provides the time $t_4$.

Figure 1C:
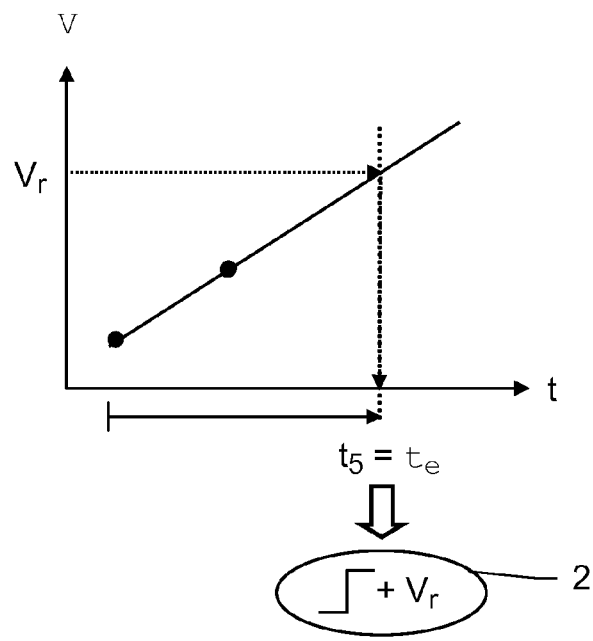

FIG. 1c depicts the procedure at a subsequent time $t_5$, which corresponds to the extrapolated time $t_e$. Since this time $t_e$, at which the master sensor is estimated to reach the desired intended value, has now been reached, a first synchronization signal-depicted here and in the following as increasing or decreasing jump—is transmitted together with the underlying intended value $V_r$, for example as common data packet 2.

Figure 1D:
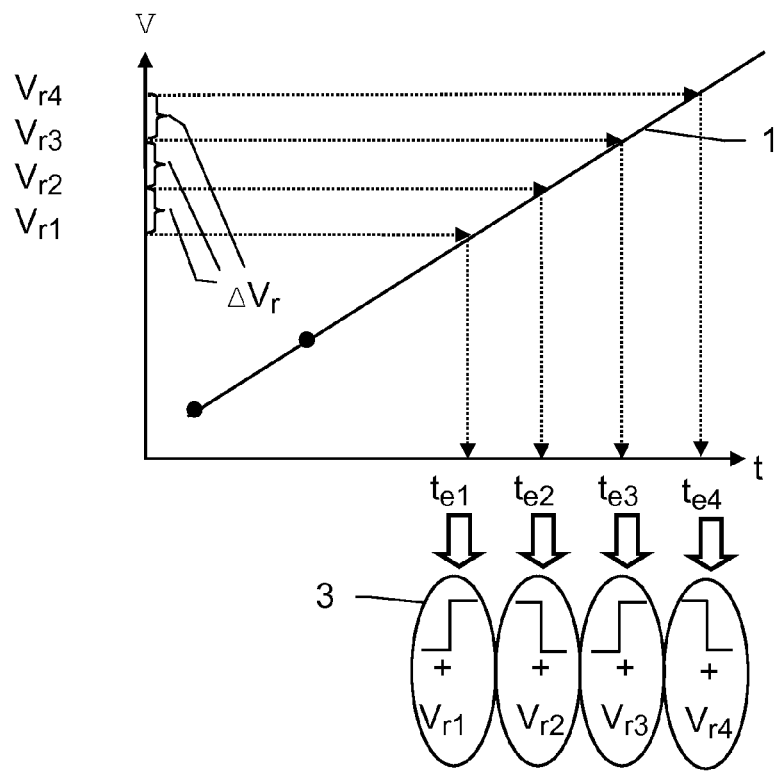

FIG. 1d shows the principle of the synchronization method for a plurality of predetermined master sensor intended values. The associated times $t_{e1}$ (which corresponds to $t_e$ from FIG. 1c), $t_{e2}$, $t_{e3}$, $t_{e4}$ are extrapolated for the predetermined master sensor intended values $V_{r1}$ (which corresponds to $V_r$ from FIG. 1c), $V_{r2}$, $V_{r3}$, $V_{r4}$ on the basis of the extrapolation rule 1. Here, the intended values have equidistant spacing $\Delta V_r$. When the respective extrapolated times arrive, a data packet 3 made of first synchronization signal and underlying intended value is transmitted in each case.

FIG. 2 depicts the principle of the synchronized measured value collection according to the synchronization method according to the invention. The data packet 2 made of first synchronization signal and underlying master sensor intended value is transmitted from the master sensor MS to a storage unit 5. The storage unit 5 stores the intended value $V_r$ and forwards the first synchronization signal 2s to the slave sensor SS. At the slave sensor SS, the first synchronization signal triggers the recording of a slave sensor measured value D. The latter is transmitted to the storage unit 5 after collection, where slave sensor measured value D and master sensor intended value $V_r$ are provided as connected value tuple 7.

FIGS. 3a-d show how, in principle, updated extrapolation rules are formed from the respective most current master sensor measured values, according to synchronization methods according to the invention.

Figure 3A:
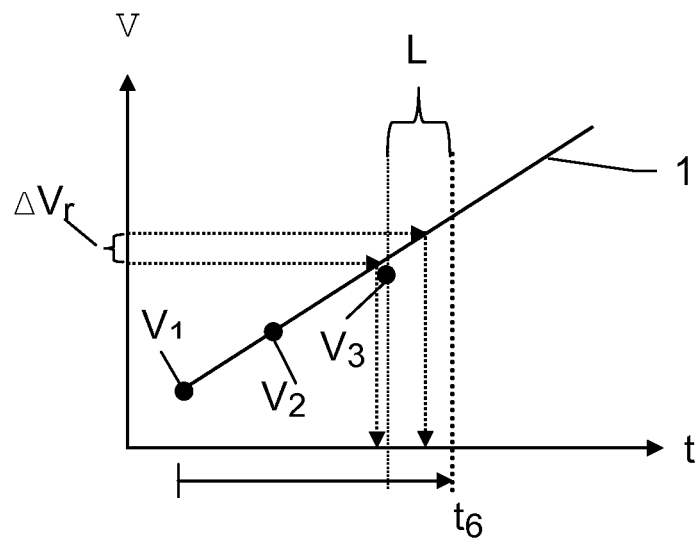
FIG. 3a-d show schematic diagrams of the provision of an updated extrapolation rule according to the invention.

FIG. 3a shows a time $t_6$, at which an extrapolation rule 1 has already been completely determined from the time/measured value pairs in relation to the measured values $V_1$ and $V_2$, and on the basis of which times are extrapolated (horizontal and vertical arrows) in relation to predetermined intended values. The measured point $V_3$ has become available at the time $t_6$ since precisely the latency time L has passed since the collection thereof.

Figure 3B:
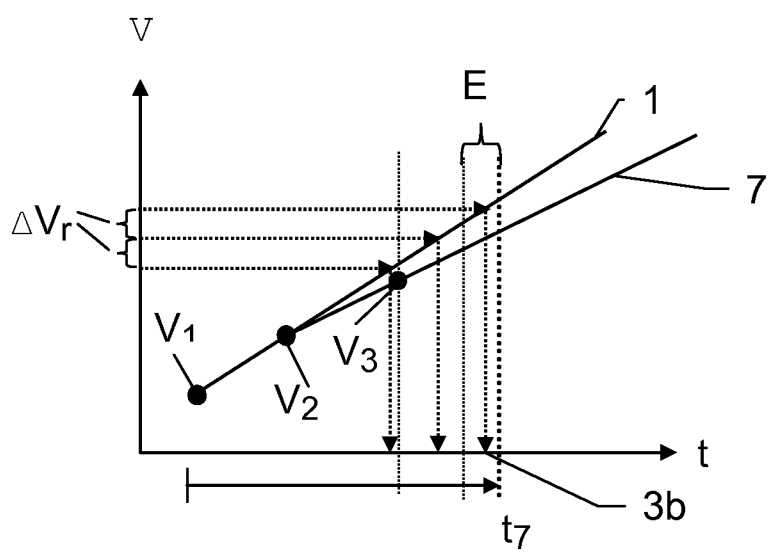

At a later time $t_7$, depicted in FIG. 3b, a newly specified extrapolation rule 7 has been provided from the time/measured value pairs in relation to the measured values $V_3$ and $V_2$. E refers to the time duration required for this, which has elapsed since $V_3$ has been collected. Within this time duration, a time 3b was extrapolated in relation to a predetermined intended value, still according to the present extrapolation rule 1. In this example, the intended values here have equidistant spacing $\Delta V_r$.

Figure 3C:
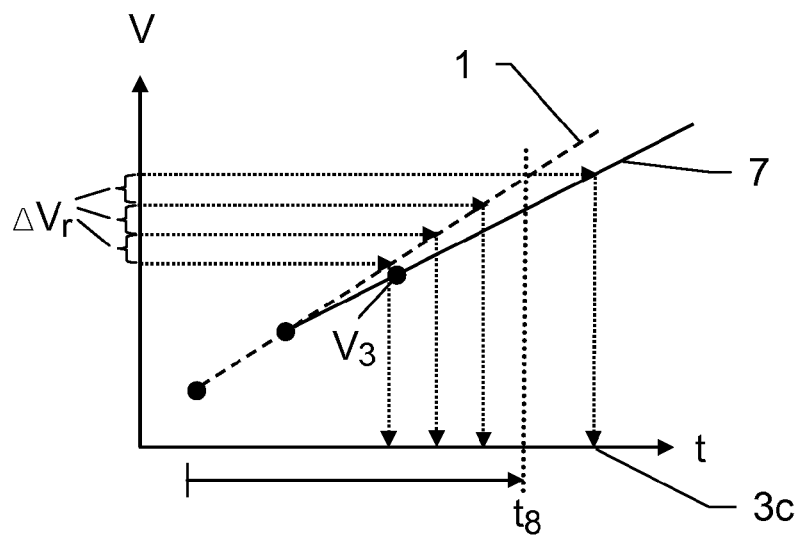

FIG. 3c shows a later time $t_8$, at which the updated extrapolation rule 7 is available for calculating synchronization times. This is why there no longer is extrapolation according to the previous extrapolation rule 1 in relation to an intended value, but rather this is carried out according to the updated extrapolation rule 7. Since the sensor measured values do not have exact regularity, this results in slightly different parameter values. Therefore, the last extrapolated future time 3c does not have the same time interval to the preceding extrapolated times as these preceding times have amongst themselves, even though all are associated with intended values with equidistant spacing $\Delta V_r$. This example elucidates the advantage of the synchronization method according to the invention that precise, in particular equidistant, sensor values and times derived therefrom can be provided, even in the case of relatively low accuracy of the master sensor, which is expressed in a non-exact regularity.

Figure 3D:
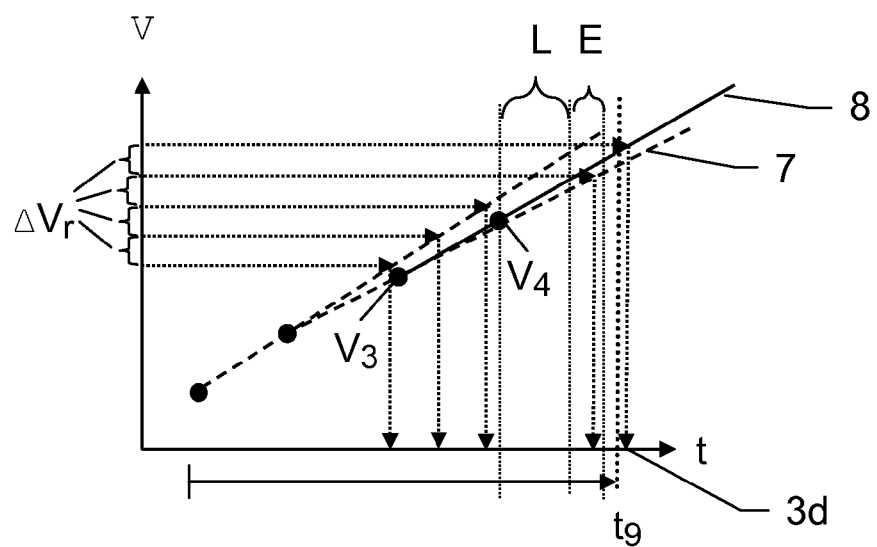

FIG. 3d depicts the situation at a later time $t_9$. A time duration longer than the latency time L has already elapsed since the collection of a fourth measured value $V_4$, which is why the fourth measured value $V_4$ is available and the time duration E for updating an extrapolation rule has also elapsed, which is why a new specific extrapolation rule 8 is provided from the appropriate time/measured value pair. In relation to a predetermined intended value, a future time 3d is extrapolated on the basis of the current extrapolation rule 8; the outdated extrapolation rule 7 is no longer used.

Figure 4:
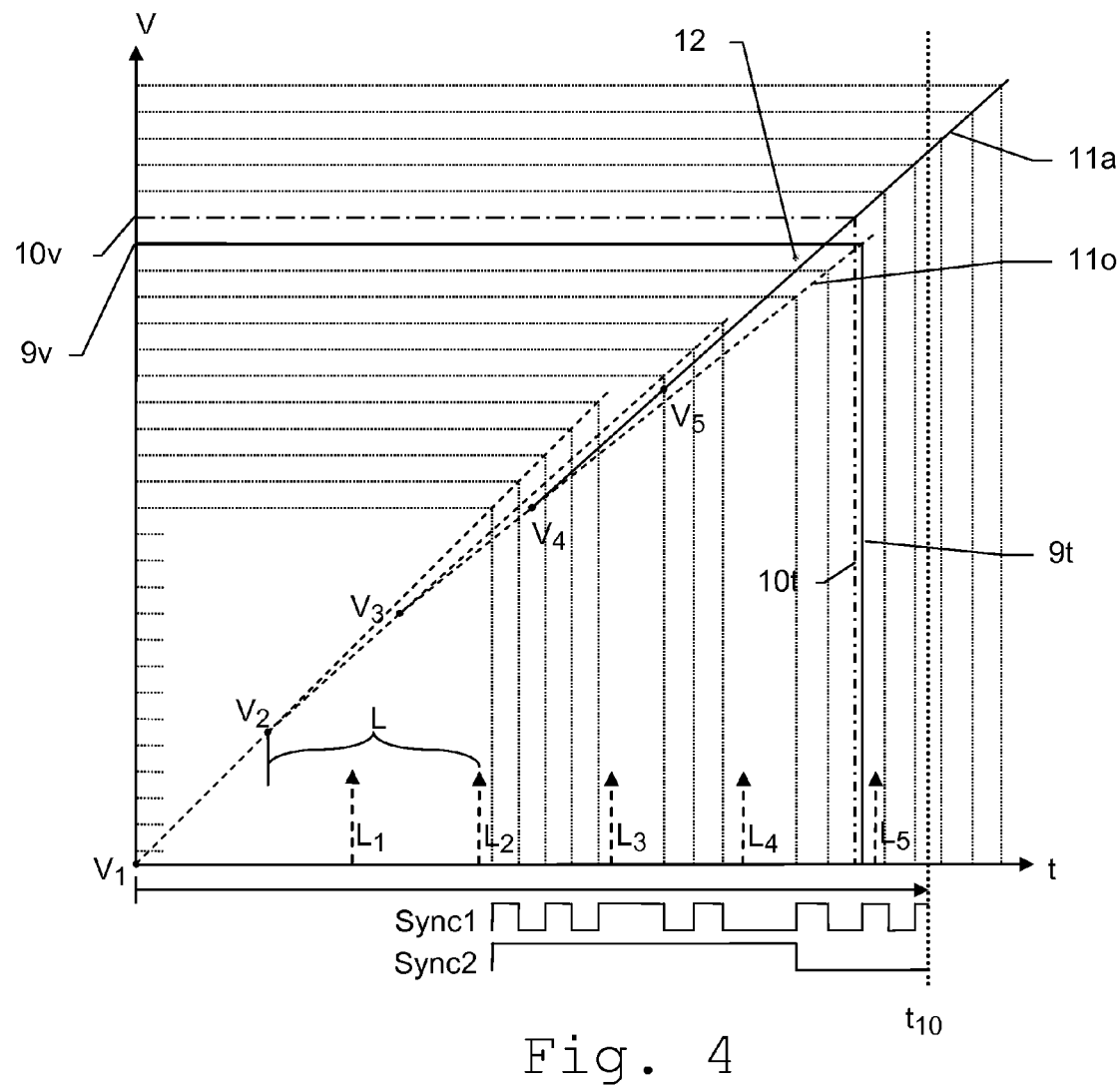
FIG. 4 shows a section of the method procedure according to the invention in respect of producing the first and the second synchronization signal.

FIG. 4 shows, in a graph, a course of the synchronization method according to the invention in respect of time extrapolation and provision of first synchronization signal Sync1 and second synchronization signal Sync2, at any time $t_{10}$, with procedures that already passed also being recorded in an exemplary manner. The master sensor measured values $V_1$ to $V_5$ have been collected and, with a time offset by the latency time L, are available at the times $L_1$ to $L_5$. A measured value 12 has until now only been collected but is not yet available for calculations.

Parameter values of the stored extrapolation rule have been calculated with the time/measured value pairs associated with $V_1$ to $V_4$, which parameter values no longer find use at the considered time $t_{10}$, which is why the corresponding extrapolation straight lines are drawn in a dashed manner, e.g. the extrapolation straight line 11o. The currently valid extrapolation rule 11a is based on the time/measured value pairs in relation to measured values $V_5$ and $V_4$.

The dotted horizontal lines and the vertical lines connected thereto and the lines 9v and 9t, 10v and 10t represent the extrapolation of times at predetermined, equidistant master sensor intended values on the basis of the individual extrapolation rules.

When these extrapolated times arrived, a first synchronization signal Sync 1 was transmitted in each case. Additionally, a second synchronization signal Sync2 was transmitted at the beginning, together with the first one of the first synchronization signals, and after a certain number of first synchronization signals, in this case after the eighth one.

Using the current parameter values, a significantly higher measured value recording speed is estimated than with the outdated values, which is expressed in FIG. 4 in a greater gradient of the extrapolation straight line 11a compared with the straight line 11o. The extrapolations in relation to the two intended values 9v and 10v, which have the same spacing from one another like the remaining intended values, are considered. As a result of the different specific algorithms, what emerges in this example is that the time 10t, associated with the intended value 10v, which is the first time calculated by the current extrapolation rule lies before the time 9t, which is associated with the intended value 9v, even though intended value 10v is "greater" than intended value 9v. Moreover, the time 10t has already passed since the provision of the current algorithm only occurred after the time $L_5$. This is why no synchronization signal Sync1 is transmitted at the time 10t and no slave sensor measured value is collected for the intended value 10v. Equidistance between the intended values cannot be maintained at this point, but it is continued by virtue of the fact that the next intended value used for synchronization has equidistant spacing from the intended value 10v which was not utilized. In order to keep the number of edges consistent in the synchronization signal Sync1, it may also be advantageous to catch up on the missing edge as quickly as possible.

Figures 5A, 5B, 5C, 5D:
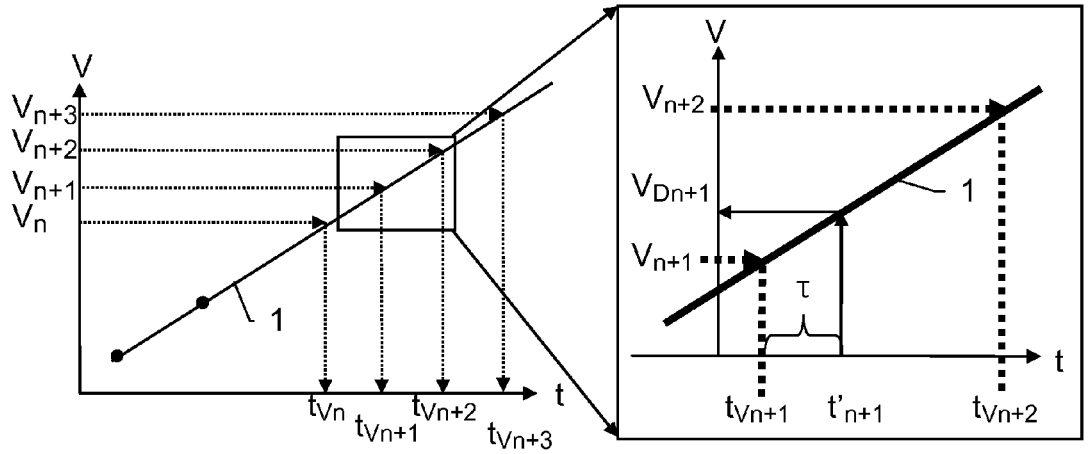
FIG. 5a-d show value storage schemes for a section of a measuring process according to the invention with a measuring system made of master sensor and a slave sensor and the principle of a synchronicity improvement by post-processing.

FIG. 5a schematically shows the provision of sensor values for a measuring system according to the invention made of a master sensor and a slave sensor. A storage unit 5 receives and stores the synchronization signals Sync1 transmitted by the master sensor, the underlying master sensor values V and the associated times $t_V$ in a connected manner, schematically depicted as a connected line. Instead of receiving the time from the master sensor, a timestamp alternatively also can be imprinted on a synchronization signal and a master sensor value by the storage unit. According to the invention, there is no need to store times; all that it is required is that associated values of master sensor and slave sensor are provided in a connected manner in relation to a synchronized time. In the example, master sensor values V and slave sensor values D are connected in each case, e.g. $V_n$ and $D_n$.

The slave sensor values D associated with a master sensor value V have been collected in each case in a time offset manner by a time interval τ from the times $t_V$ due to signal run-times and latency times, i.e. they are collected at a time $t_D = t_V + \tau$. In one advantageous embodiment, a subsequently interpolated value can therefore be stored instead of or in addition to a master sensor value V. As a result, the extrapolation accuracy is monitored and corrections can be undertaken during post-processing.

FIGS. 5b-d depict such an option according to the invention for correcting the time offset by a time interval τ of synchronized master sensor values V and slave sensor values D. Considered is the data record of slave sensor value $D_{n+1}$ and master sensor value $V_{n+1}$.

As can be seen from FIGS. 5b and 5c, the time $t_{Vn+1}$ is associated with the master sensor value $V_{n+1}$; $D_{n+1}$ was recorded offset to this by the time interval τ at a time $t_{n+1}$ (corresponds to $t_{Dn+1}$ in FIG. 5a). $V_{n+1}$ is now to be replaced by a master sensor value $V_{Dn+1}$, which is estimated to have been present at the time $t'_{n+1}$. To this end, an extrapolation is carried out on the basis of the associated extrapolation rule 1, as indicated by the vertical arrow and adjoining horizontal arrow in FIG. 5c. As a result of the subsequent replacement, $V_{Dn+1}$ and $D_{n+1}$ now form a connected tuple. This is carried out in the same way for the further master sensor values $V_{Dn}$, $V_{Dn+2}$ and $V_{Dn+3}$. This is how the connected value tuples shown in FIG. 5d emerge, which each contain sensor values that were both present at the respective time t': the slave sensor values D as measured values and the master sensor values $V_D$ as interpolated values.

In a schematic oblique view, FIG. 6a depicts a sensor measuring system according to the invention made of a master sensor and two slave sensors using the example of a laser scanner according to the invention.

A laser rangefinder EDM transmits a laser beam 19. This beam is routed by a deflection mirror 18 to the surface 20 of an object to be measured. Light reflected from there is recorded by the laser rangefinder and the respective spacing between laser scanner and respective surface point is determined by a run-time measurement or a phase-comparison measurement. In order to record a scanning pattern of surface points, the deflection mirror 18 is rotated about two orthogonal axes 16m and 16s. The rotation is performed by two angle sensors MS and SS and the respective alignment angles of these are measured. In the example, the angle sensor MS rotates about the quickly rotating vertical axis 16m and the angle sensor SS rotates about the slowly progressively rotating horizontal axis 16s. The angle changes are equidistant in both directions such that, line-by-line, a uniform point scanning pattern is produced. Three surface points 21a, 21b, 21c, which are successively targeted and measured by the laser beam 19, are depicted in an exemplary manner. As a result of the equidistant angle change 20a and 20b, these have an approximately equidistant spacing in the vertical direction.

In the shown arrangement, the angle sensor MS acts as master sensor according to the invention, triggering a measured value collection according to the synchronization method according to the invention by the two slave sensors EDM and SS according to the invention. A central control and evaluation unit CU, which is connected to the sensors EDM, MS and SS via communication channels 17a, 17b and 17c, in this case ensures the necessary signal transfer and provides sensor values and data records.

FIG. 6b and FIG. 6c depict a section of the point scanning pattern obtained by a laser scanner, wherein a depiction of distance information was abstained from. FIG. 6b shows an irregular scanning pattern, as can be produced by a laser scanner according to the prior art. The spacing of the individual points which correspond to the measured surface points are not equidistant throughout. By contrast, as a result of the laser scanner according to the invention, a regular point grid, as depicted in FIG. 6c, is produced since the distance values were collected at equal angles and therefore all surface points in this projection onto a plane have approximately the same spacing from one another.

Figures 7A, 7B:
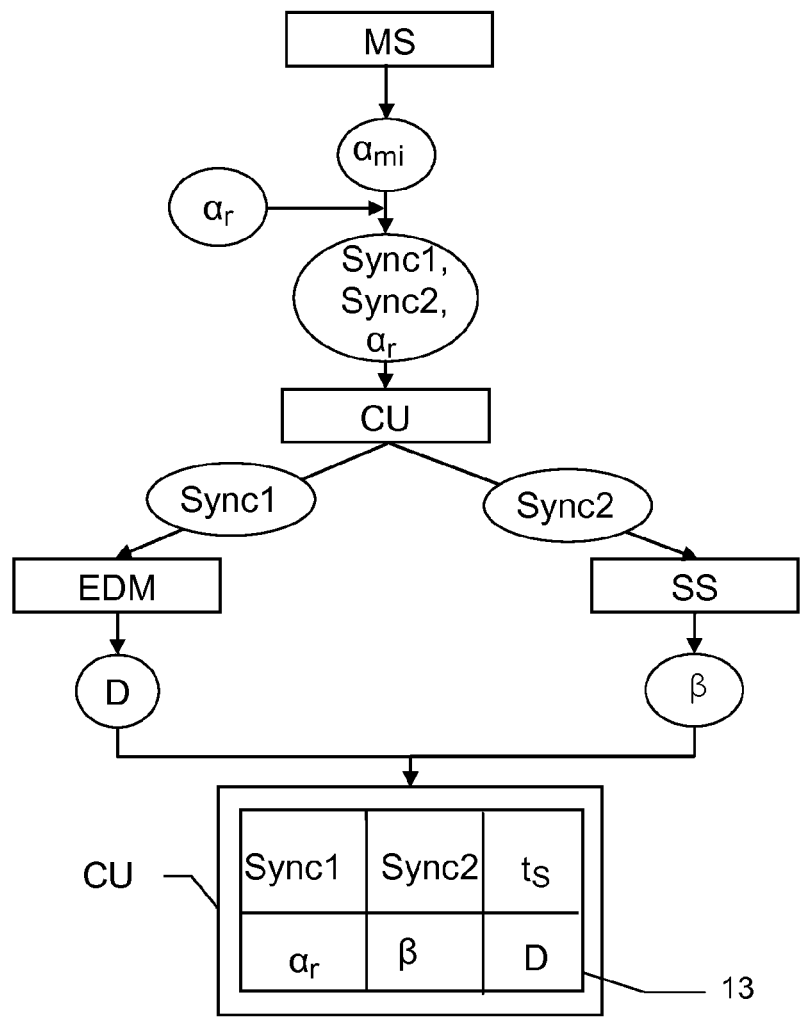
FIG. 7a-b shows the schematic diagram of a measuring process according to the invention with a laser scanner according to the invention and a section of a sensor value storage scheme resulting therefrom.

FIG. 7a shows the principle of a measuring procedure according to the invention using a measuring system according to the invention according to FIG. 6a.

The angle sensor MS acting as master sensor continuously collects angle measured values $\alpha_{mi}$. From these, as described above, times are extrapolated in relation to preferably equidistant angle intended values $\alpha_r$, at which a first synchronization signal Sync1 and, for a specific number of first synchronization signals Sync1, a second synchronization signal Sync2 are transmitted. In particular, the number can also equal one. The synchronization signals are transmitted to the control and evaluation unit CU together with the underlying angle intended values $\alpha_r$. The angle intended value $\alpha_r$ is stored by said control and evaluation unit and the two synchronization signals are transferred to the two slave sensors.

The first synchronization signal Sync1 is transmitted to the laser rangefinder EDM, while the second synchronization signal Sync2, which occurs less frequently, is transmitted to the second angle sensor SS. As a result of this subdivision, a measured point scanning pattern is produced line-by-line, since a distance measurement of the laser rangefinder EDM is triggered by the first synchronization signal Sync1 in relation to each angle intended value $\alpha_r$, whereas an angle determination by the angle sensor SS is only triggered after a certain number of angle intended values $\alpha_r$ by the second synchronization signal Sync2, which angle sensor determines the alignment angle of the slowly rotating axis. In the example, a measuring procedure with both synchronization signals is considered.

The distance measurement by the laser rangefinder EDM results in a distance value D; the angle determination by the angle sensor SS results in an angle value β. The two sensor values are transmitted to the control and evaluation unit CU. The latter provides as connected value tuple 13 the following sensor values: angle intended value $\alpha_r$, angle value β and distance value D. Additionally, the first and the second synchronization signal Sync1 and Sync2 and the time $t_s$ associated with the synchronization signals and sensor values are stored in the example.

FIG. 7b shows an example for a plurality of value tuples of connected sensor values for a measuring system according to the invention according to FIG. 6a. An angle value $β_1$ of the slave angle sensor and a distance value $D_1$ of the laser rangefinder are recorded and provided as connected data record 13a in relation to a first angle intended value $\alpha_{r1}$ of the master sensor. For line-by-line scanning, the angle value $β_1$ remains the same in the following data record 13b up to the next angle intended value $\alpha_{r2}$, which is associated with a second distance value $D_2$. This is continued in the same manner for a specific number n−1 of angle intended values $\alpha_r$. After this number n−1, a recording of a second angle value $β_2$ and hence of a next line of surface points is triggered by the second synchronization signal Sync2. The angle value $β_2$ is provided as connected data record 13c together with the angle intended value underlying the second synchronization signal Sync2 and the distance value $D_n$ collected in a synchronized manner, wherein the angle intended value in this example once again has the initial value $\alpha_{r1}$ in order to bring about line-by-line scanning. According to the method according to the invention, this procedure is continued—in the example while maintaining equidistant spacing for both the angle intended values and the slave sensor angle values, i.e. $\Delta\alpha_{ri}$=const and $\Delta β_i$=const—as a result of which a uniform point scanning pattern or a regular three-dimensional point cloud is obtained from measuring an object surface by means of the synchronization method according to the invention. As an alternative to this, it is possible to obtain e.g. a helical scanning pattern by virtue of a second synchronization signal Sync2 being produced for each first synchronization signal Sync1, as a result of which both angle sensors in each case newly record an angle value.

What is claimed is:

1. A sensor measuring system, comprising:
    a master sensor,
    at least one slave sensor with signal reception unit, configured such that the at least one slave sensor records at least one sensor value when receiving a first synchronization signal;
    a processing unit that, in relation to a predetermined master sensor intended value, is configured to extrapolate a time on the basis of at least two measured values of the master sensor, collected at different times;
    a signal transmission unit configured to transmit at least the first synchronization signal when an extrapolated time is reached; and
    a data storage unit configured to provide at least one value tuple made of the predetermined master sensor intended value and the associated at least one slave sensor value.

2. The sensor measuring system according to claim 1, further comprising:
    a control and evaluation unit with clock that:
        receives, provides, transmits and evaluates at least the first synchronization signal, time values and sensor values of at least the master sensor and the at least one slave sensor; and
        provides times or recording times, associated with the at least one sensor value, for downstream data processing.

3. The sensor measuring system according to claim 1, wherein the system is a laser scanner comprising:
    a laser rangefinder as a first slave sensor;
    an angle measuring unit, which determines the first direction angle of the beam direction of the laser rangefinder, as the master sensor;
    an angle measuring unit, which determines the second direction angle of the beam direction of the laser rangefinder, as a second slave sensor; and
    a control and evaluation unit.

4. A synchronization method for a master sensor and at least one slave sensor, for synchronized recording of at least one sensor value by the at least one slave sensor in relation to an intended value of the master sensor to be predetermined, comprising:
    providing the sensor measuring system of claim 1;
    collecting a first time/measured value pair by the master sensor at a first time;
    collecting at least a second time/measured value pair by the master sensor at a second time;
    providing an extrapolation rule by calculation from the first time/measured value pair and at least the second time/measured value pair;
    providing of at least a first extrapolated time associated with an intended value of the master sensor to be predetermined, on the basis of the extrapolation rule, by the processing unit;
    transmitting at least the first synchronization signal to the at least one slave sensor when the extrapolated time occurs and/or when a delay time, different from the extrapolated time in a temporally defined manner, occurs;

triggering a recording of at least one slave sensor value by a first synchronization signal; and providing the intended value and the at least one slave sensor value as connected value tuple.

5. The synchronization method according to claim 4, wherein:

the synchronization is value-based and predictive in such a way that an intended value is predetermined such that the associated extrapolated time lies after the second time.

6. The synchronization method according to claim 5, wherein:

the associated extrapolated time lies in the future.

7. The synchronization method according to claim 5, wherein:

at least a second, successive extrapolated time associated with a second intended value of the master sensor to be predetermined, on the basis of the extrapolation rule, is provided by the processing unit, whereby a minimum interval is maintained between the first and second extrapolated times in order to keep the sensor values distinguishable from one another.

8. The synchronization method according to claim 5, wherein:

the recording of values of a first slave sensor is triggered by the first synchronization signal; and the recording of values of further slave sensors is triggered by further synchronization signals.

9. The synchronization method according to claim 4, wherein:

in the at least one slave sensor, the triggered recording of the at least one slave sensor value comprises the collection of a sensor measured value as the at least one slave sensor value.

10. The synchronization method according to claim 9, for a master sensor and at least two slave sensors, wherein:

in the at least two slave sensors, the triggered recording of the at least one slave sensor value comprises the collection of a sensor measured value as the at least one slave sensor value.

11. The synchronization method according to claim 4, wherein:

the calculation from the first time/measured value pair and the at least second time/measured value pair comprises calculation of parameter values of a stored extrapolation algorithm with the first time/measured value pair and at least the second time/measured value pair.

12. The synchronization method according to claim 11, wherein:

the calculation of parameter values is performed using at least one further state signal of the master sensor, with the stored extrapolation algorithm being selected in advance in an automated manner from a plurality of stored extrapolation algorithms.

13. The synchronization method according to claim 11, wherein:

master sensor measured values are collected continuously and an availability of a new time/measured value pair triggers a provision of an updated extrapolation rule by newly calculating the parameter values using the new time/measured value pair.

14. The synchronization method according to claim 13, wherein:

newly calculating the parameter values using the new time/measured value pair is performed with deviations being determined between newly calculated parameter values and previously calculated parameter values; and use of the newly calculated parameter values occurs only if the deviations do not exceed a defined amount.

15. The synchronization method according to claim 4, wherein:

a plurality of intended values of the master sensor to be predetermined is provided and a numeral spacing between the plurality of intended values to be predetermined is equidistant.

16. The synchronization method according to claim 4, wherein:

a second synchronization signal is transmitted in relation to defined numbers of first synchronization signals, in such a way that the second synchronization signal renders it possible to assign each first synchronization signal uniquely to an underlying master sensor measured value.

17. The synchronization method according to claim 4, wherein:

the extrapolated time lies after the delay time derived therefrom; and the time difference between the delay time and the extrapolated time underlying the delay time is such that the transmission of the synchronization signal at the delay time causes the recording of the slave sensor value at the extrapolated time.

18. The synchronization method according to claim 4, wherein:

within a connected value tuple, one master sensor value is replaced by the master sensor value available at the time of recording of the at least one slave sensor value in such a way that the master sensor intended value is replaced by a master sensor measured value collected at this time or by a master sensor value extrapolated or interpolated for this time from collected master sensor measured values.

19. The synchronization method according to claim 4, wherein the method steps of:

providing the extrapolated time in relation to the predetermined master sensor intended value;

transmitting of the at least one synchronization signal;

recording the at least one slave sensor value; and provision of the predetermined master sensor intended value and the at least one slave sensor value, are also carried out when master sensor measured values are no longer collected.

20. The synchronization method according to claim 4, wherein:

collecting a first and/or second master sensor measured value is based on reading-out a position code.

* * * * *